[19] United States Patent
Fischer et al.
[11] Patent Number: 5,063,010
[45] Date of Patent: Nov. 5, 1991

[54] MAKING PRESSED BOARD

[75] Inventors: Tilman Fischer, Meerbusch; Hans-Dietrich Sitzler, Nettetal; Werner Ufermann, Schwalmtal, all of Fed. Rep. of Germany

[73] Assignee: G. Siempelkamp GmbH & Co., Krefeld, Fed. Rep. of Germany

[21] Appl. No.: 511,411

[22] Filed: Apr. 20, 1990

[30] Foreign Application Priority Data

Apr. 28, 1989 [DE] Fed. Rep. of Germany ....... 3914106

[51] Int. Cl.[5] ................ B29C 43/22

[52] U.S. Cl. ................ 264/109; 264/83; 264/101; 264/102; 425/371; 425/405.1; 425/406

[58] Field of Search ................ 264/83, 101, 102, 109, 264/120; 425/371, 405.1, 406, 407

[56] References Cited

U.S. PATENT DOCUMENTS 4,517,147 5/1985 Taylor et al. ................ 264/83
4,684,489 8/1987 Walter ................ 264/101
4,850,849 7/1989 Hsu ................ 425/407
4,923,656 5/1990 Held ................ 264/70
4,937,024 6/1990 Hickson ................ 264/83

FOREIGN PATENT DOCUMENTS 3640682 6/1988 Fed. Rep. of Germany .

*Primary Examiner*—Mary Lynn Theisen
*Attorney, Agent, or Firm*—Herbert Dubno; Andrew Wilford

[57] ABSTRACT

A fiber or chip board is made by first forming a mixture of a binder and particles having a relatively low moisture content that is substantially less than a relatively high moisture content that a finished board should have. This mixture is deposited as a mat on a movable substrate so that the mat is substantially at ambient temperature and has the relatively low moisture content. Then the mat is preheated with steam to raise its temperature and to increase its moisture content to the predetermined relatively high moisture content. The thus preheated mat, whose moisture content has been corrected, is then simultaneously heated and compressed to form it into a board.

12 Claims, 2 Drawing Sheets

MAKING PRESSED BOARD

FIELD OF THE INVENTION

The present invention relates to the manufacture of pressed fiberboard, chipboard, and the like. More particularly this invention concerns the continuous manufacture of such a product.

A fiberboard, chipboard, or the like is made by mixing the necessary particles—fibers or chips—with a normally aqueous binder and then depositing this mixture on a continuously moving substrate, typically a foraminous belt. This belt delivers the mat to a continuous-type press having an upper belt, a lower belt, and a pair of traveling platens, although it is also known for the belt to pass through the press. The mat is vertically compressed between the platens as same move downstream along with the traveling mat. It is possible to prepress the mat before it enters the press, typically by means of rollers, and it is known to longitudinally subdivide the mat into a longitudinal sequence of separate mat sections. In the press the mat is both compressed and heated to activate the binder and form the thick and loose mat into a hard and thin board.

For best results it is normally considered necessary for the mat to have when it goes into the press a moisture content of about 12% by weight. This moisture content is determined by the amount of water preexisting in the particles being pressed plus the amount in the binder which, as mentioned above, typically is water based. Another important factor that affects product quality is pressing time, as it is necessary to bring the binder to a certain temperature to activate it. This pressing time is in turn a function of the starting temperature of the mat and the amount of time the mat spends in contact with the hot faces of the press. In its turn the amount of time the product spends being pressed is a function of the length of the press and the speed at which the mat is moving through this press.

Thus in order to increase throughput it is necessary to increase transport speed, thereby increasing the press cadence and decreasing the pressing time. As a result the only way to get the binder hot enough is to preheat the mat as described in German patent document 3,640,682 or to increase the length of the press. The former system uses superheated steam as a preheating agent, but is burdened with the considerable problem of steam inclusions in the pressed board so that special precautions must be taken to eliminate this steam, otherwise the finished board has a moisture content that is too high.

OBJECTS OF THE INVENTION

It is therefore an object of the present invention to provide an improved board-making method and apparatus.

Another object is the provision of such an improved board-making method and apparatus which overcomes the above-given disadvantages, that is which can operate at relatively high speed but which avoids the pitfalls of the prior art.

Yet another object is to provide an improved board-making system which can either get improved output from a standard-length press, or that can achieve normal output from a particularly short press.

SUMMARY OF THE INVENTION

The board-making method according to this invention comprises the step of first forming a mixture of a binder and particles having a relatively low moisture content that is substantially less than a relatively high moisture content that a finished board should have. This mixture is deposited as a mat on a movable substrate so that the mat is substantially at ambient temperature and has the relatively low moisture content. Then according to the invention the mat is preheated with steam to raise its temperature and to increase its moisture content to the predetermined relatively high moisture content. The thus preheated mat, whose moisture content has been corrected, is then simultaneously heated and compressed to form it into a rigid board.

Thus with the system of this invention the condensate formed in the mat and the steam trapped therein is not a problem; instead it forms part of the mixture that forms the board. The preheating step therefore in effect forms part of both the processing operation and the content-defining operation. Thus the mat going into the press can be already quite hot, but will not be freighted with excess moisture. As a result press time can be kept quite short so that a high production rate can be used even on a standard fixed-length press. On the other hand a fairly short press can be used while still achieving a high output rate.

In accordance with this invention the high moisture content is between 10% and 15% by weight, preferably 12%. The low moisture content is between 5% and 10% by weight, preferably 8%. Normal ambient-pressure, that is not superheated, steam or a steam/air mixture can be used in the preheater. The steam or steam-/air mixture has a temperature between 100° C. and 140° C.

The particles according to the invention are quite dry and are mixed with a binder prior to deposition onto the substrate. The starting low moisture content is thus set by establishing a predetermined water content in the binder.

Furthermore before the mat is preheated with steam it has a predetermined interstitial air content and the steam with which the mat is contacted is sufficient to displace and replace all of the interstitial air. When the mat is prepressed a quantity of steam is used to preheat the mat that is sufficient to completely replace all interstitial air in the mat. The mat is preheated with steam by being applied thereto in several succeeding stages and the preheating step raises the temperature of the mat by between 50° C. and 80° C.

DESCRIPTION OF THE DRAWING

The above and other objects, features, and advantages will become more readily apparent from the following, reference being made to the accompanying drawing in which.

SPECIFIC DESCRIPTION

Figure 1:
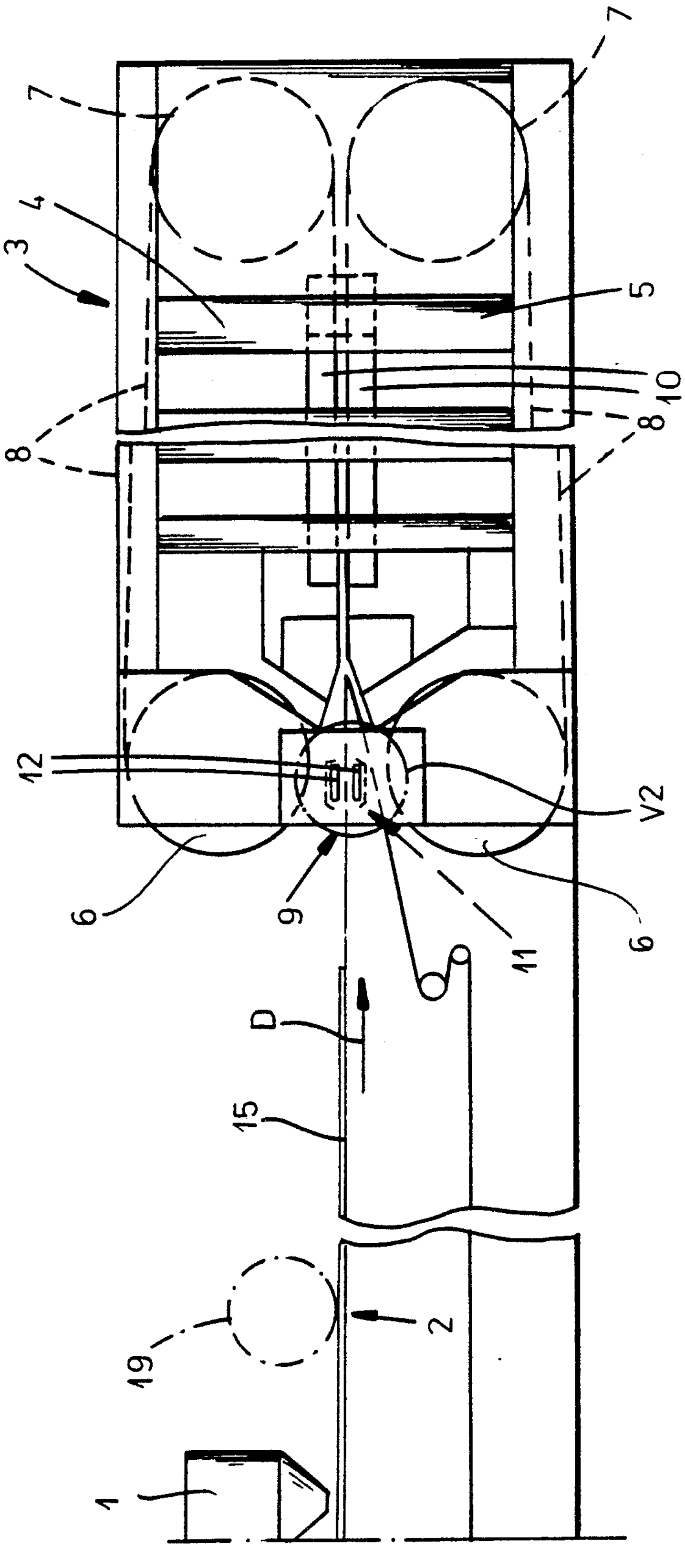
FIG. 1 is a small-scale and partly diagrammatic side view of the apparatus for carrying out the process of this invention.

As seen in FIG. 1 a supply 1 forms a mixture of fibers or chips and binder having a moisture content of about 8% by weight and deposits it on a belt 2 moving in a direction D to form a mat 15 on the belt 2. The belt 2 extends at its downstream end into a press 3 having a frame 4 supporting upper and lower upstream rollers 6, upper and lower downstream rollers 7, and upper and lower belts 8 each spanned over a respective roller 6 and 7 and defining a pressing gap having an open upstream end 9. Heated platens 10 in the press 3 can bear on the outer faces of the working reaches of the belts 8 to heat and compress the mat 15 into a stiff board. A prepressing roller 19 may be provided between the mat-forming device 1 and the press 3.

Figure 2:
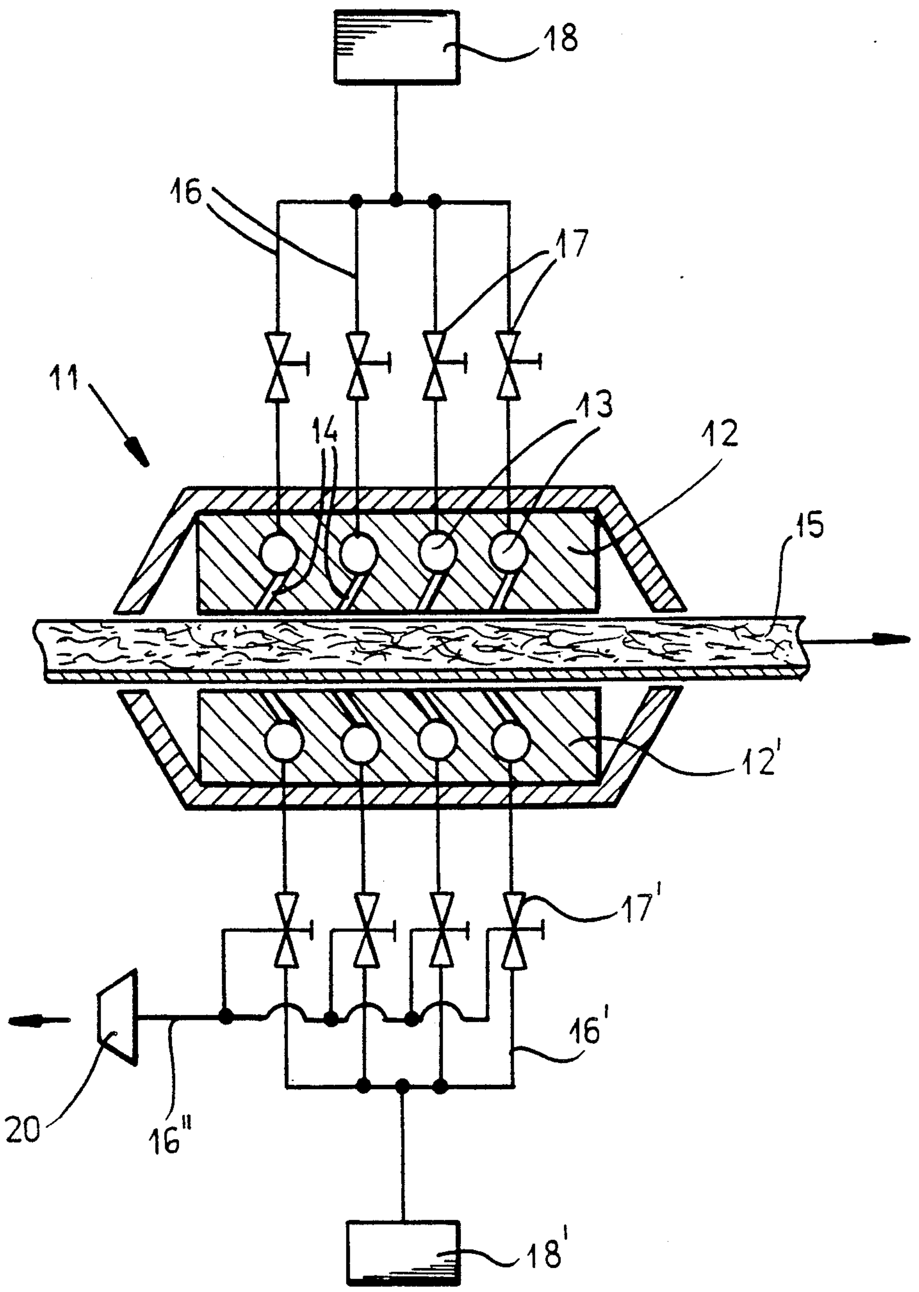
FIG. 2 is a large-scale diagrammatic view of the detail indicates at V2 in FIG. 1.

FIG. 2 shows how the upstream mouth 9 of the press is provided with a steam preheating, moisture-correcting unit 11. This unit 11 comprises plates 12 and 12' each extending transversely all the way across the mat 1 and each formed with four transversely throughgoing manifold passages 13 spaced in the travel direction D and each in turn formed with a plurality of passages 14 opening at the face of the respective plate 12 or 12' directed toward the mat 15. The passages 14 are inclined into the travel direction. The passages of the upper plate 12 are connected via feed lines 16 provided with valves 17 to a source 18 of steam at 105° to 140° C. The passages 13 of the lower plate 12 are connected via valves 17' either to lines 16' leading to another such steam source 18', or to lines 16'' leading to a suction device 20.

The dispensing system 1 is set to produce a relatively dry mix, having about 8% moisture by weight. This mix is at room temperature. The steam preheating system 11 raises the temperature of the mat 15 about 65° C. and increases its moisture content to about 12%. Thus the mat 15 enters the press fairly hot, and with just the right moisture content.

When the prepressing unit 19 is used the lower plate 12' is switched to suction mode to ensure good penetration of the steam from the upper plate 12 into the mat 15. In this case substantially more steam is used.

We claim:

1. A method of making a board, the method comprising the steps of sequentially:
   - forming a mixture of an aqueous binder and particles having a relatively low moisture content of between 5% and 10% by weight;
   - depositing the mixture as a mat on a movable substrate, the mat being substantially at ambient temperature and having the relatively low moisture content;
   - preheating the mat with steam at a temperature of between 100° C. and 140° C. to raise the mat's temperature and to increase its moisture content to a relatively high moisture contents of between 10% and 15% by weight; and
   - simultaneously heating and compressing the mat to form same into a board.

2. The board-making method defined in claim 1, further comprising the step of:
   - mixing the particles with a binder prior to deposition onto the substrate.

3. The board-making method defined in claim 2, further comprising the step of:
   - setting the low moisture content by establishing a predetermined water content in the binder.

4. The board-making method defined in claim 1 wherein before the mat is preheated with steam it has a predetermined interstitial air content, the steam with which the mat is contacted being sufficient to displace and replace all of the interstitial air.

5. The board-making method defined in claim 4 wherein a quantity of steam is used to preheat the mat that is sufficient to completely replace all interstitial air in the mat.

6. The board-making method defined in claim 1 wherein the mat is preheated with steam by being applied thereto in several succeeding stages.

7. The board-making method defined in claim 1 wherein the preheating step raises the temperature of the mat by about 50° C.

8. The board-making method defined in claim 7 wherein the preheating step raises the temperature of the mat by at most about 80° C.

9. The board-making method defined in claim 1 wherein the mat has two opposite sides and is preheated by having the steam blown into it from one side, the method further comprising the step of
   - aspirating gases through the other side of the mat simultaneously with blowing stem into the one side.

10. The board-making method defined in claim 1 wherein the mat is preheated by injecting the stem into the mat, the method further comprising the step of
    - displacing generally all air inclusions in the mat out of the mat by means of the steam.

11. The board-making method defined in claim 1 wherein the low moisture content is about 8% by weight.

12. The board-making method defined in claim 1 wherein the high moisture content is about 12% by weight.

* * * * *